United States Patent [19]
Hwangbo

[11] Patent Number: 5,894,462
[45] Date of Patent: Apr. 13, 1999

[54] MAGNETOOPTICAL DISK FOCUS AND TRACKING SERVO FOR A MAGNETOOPTICAL DISK SERVO DEVICE

[75] Inventor: Min Hwangbo, Anyang, Rep. of Korea

[73] Assignee: Samsung Electronics Co., Ltd., Kyungki-do, Rep. of Korea

[21] Appl. No.: 08/791,140

[22] Filed: Jan. 30, 1997

[30] Foreign Application Priority Data

Feb. 1, 1996 [KR] Rep. of Korea .................. 96-2450

[51] Int. Cl.$^6$ ........................................... G11B 7/095
[52] U.S. Cl. ............................ 369/44.29; 369/44.35
[58] Field of Search ........................ 369/44.41, 44.35, 369/44.36, 44.29, 44.25, 44.42, 44.37, 44.34

[56] References Cited

U.S. PATENT DOCUMENTS

| | | | |
|---|---|---|---|
| 4,977,551 | 12/1990 | Minami et al. | 369/44.25 |
| 5,004,901 | 4/1991 | Yoshimoto et al. | 369/44.29 |
| 5,097,458 | 3/1992 | Suzuki | 369/44.34 |
| 5,109,367 | 4/1992 | Yoshikawa | 369/44.25 |
| 5,343,454 | 8/1994 | Watanabe et al. | 369/44.35 |
| 5,517,474 | 5/1996 | Takamine | 369/44.35 |
| 5,559,770 | 9/1996 | Hiroki et al. | 369/44.36 |

FOREIGN PATENT DOCUMENTS

| | | |
|---|---|---|
| 40 41 302 | 7/1991 | Germany . |
| 61-11945 | 1/1986 | Japan . |

OTHER PUBLICATIONS

Patent Abstracts of Japan vol. 17, No. 536 (P-1620), Sep. 27, 1993, & JP 05 144024 A (Konica Corp.), Jun. 11, 1993, *Abstract.

Patent Abstracts of Japan vol. 17, No. 408 (P-1582), Jul. 29, 1993 & JP 05 073982 A (Sharp Corp.), Mar. 26, 1993, *Abstract.

*Primary Examiner*—Thang V. Tran
*Attorney, Agent, or Firm*—Sughrue, Mion, Zinn, Macpeak & Seas, PLLC

[57] ABSTRACT

A magnetooptical disk focus servo and tracking servo which remain stable and which make various servo control gains uniform even when the amount of light detected in a photodetecting portion changes. An operator outputs a sum signal by adding signals corresponding to an amount of light detected in at least two photodiodes among a plurality of photodiodes of the photodetecting portion. A first divider divides a focus error signal by the sum signal. A second divider divides a tracking error signal by the sum signal. A focus servo portion controls a focus actuator using the output of the first divider, and a tracking servo portion for controlling a track actuator with the output of the second divider.

14 Claims, 3 Drawing Sheets

MAGNETOOPTICAL DISK FOCUS AND TRACKING SERVO FOR A MAGNETOOPTICAL DISK SERVO DEVICE

BACKGROUND OF THE INVENTION

1. Field of the Invention

The present invention relates to a magnetooptical disk servo device, and more particularly, to a focus servo and a tracking servo for a magnetooptical disk which remain stable, and which make various servo control gains uniform even when the quantity of light detected at a photodetecting portion changes. The present application is based upon Korean Application No. 96-2450, which is incorporated herein by reference.

2. Description of the Related Art

Generally, when the received quantity of light in a photodiode of a photodetecting portion changes, the servo device of the magnetooptical disk can become unstable since the entire gain of the servo is affected, and thus the control system can become unstable. When the change in the quantity of light received is severe, the servo can even oscillate.

SUMMARY OF THE INVENTION

It is an object of the present invention to provide a magnetooptical disk focus servo which remains stable with changing quantities of detected light, and which makes the servo control gain uniform, even when the quantity of light detected at a photodetecting portion changes. To achieve this object, there is provided a magnetooptical disk focus servo comprising an operator for outputting a sum signal by adding signals corresponding to the amount of light detected in at least two photodiodes among a plurality of photodiodes of a photodetecting portion, a divider for dividing the focus error signal by the sum signal, and a focus servo for controlling a focus actuator with the output of the divider, to thereby reduce a change in gain of the servo.

It is another object of the present invention to provide a magnetooptical disk tracking servo which remains stable with changing quantities of detected light, and which makes the servo control gain uniform even when the quantity of light detected at a photodetecting portion changes. To achieve this object, there is provided a magnetooptical disk tracking servo device comprising an operator for outputting a sum signal by adding signals corresponding to the amount of light detected in at least two photodiodes among a plurality of photodiodes of a photodetecting portion, a divider for dividing a tracking error signal by the sum signal, and a tracking servo for controlling a track actuator with the output of the divider, to thereby reduce a change in gain of the servo.

It is still another object of the present invention to provide a magnetooptical disk servo which remains stable with changing quantities of detected light, and which makes the servo control gain uniform, even when the quantity of light detected at a photodetecting portion changes. To achieve this object, there is provided a magnetooptical disk servo comprising an operator for outputting a sum signal by adding signals corresponding to the amount of light detected in at least two photodiodes among a plurality of photodiodes of a photodetecting portion, a first divider for dividing a focus error signal by the sum signal, a second divider for dividing a tracking error signal by the sum signal, a focus servo for controlling a focus actuator with the output of the first divider, and a tracking servo for controlling a track actuator with the output of the second divider.

2

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENT INVENTION

Figure 1:
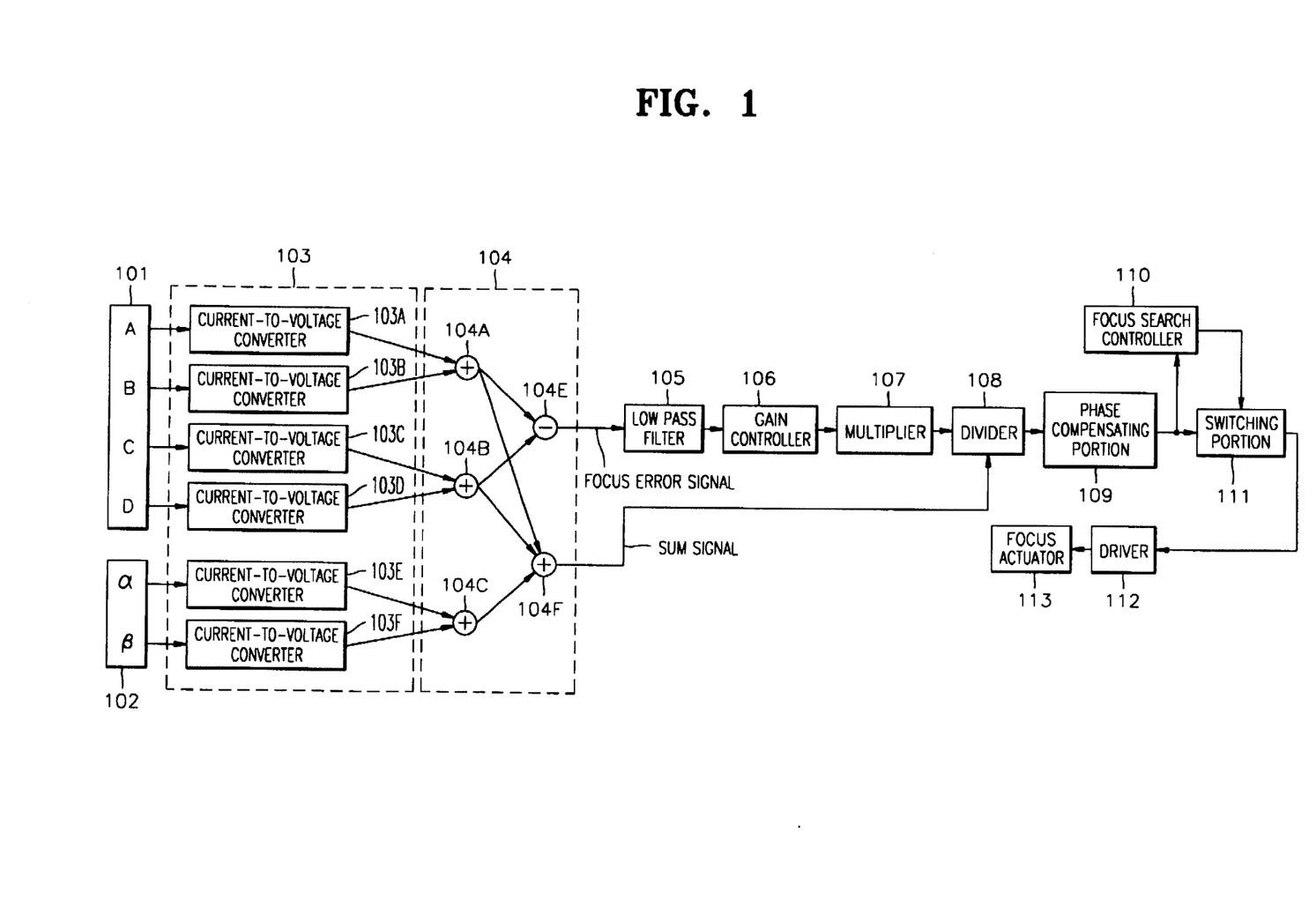
FIG. 1 is a block diagram illustrating a magnetooptical disk focus servo which remains stable with changing quantities of detected light.

FIG. 1 illustrates a magnetooptical disk focus servo which remains stable with changing quantities of detected light. The focus servo includes a first photodetecting portion 101 having at least two sets of photodiodes (A–D) for detecting an optical signal required for producing a sum signal and a focus error signal, a second photodetecting portion 102 having at least two sets of photodiodes ($\alpha$ and $\beta$) for detecting the optical signal required for operating the sum signal, a current-to-voltage converter portion 103 for converting received currents into voltages, an operator 104 for calculating the focus error signal and the sum signal using the signals converted into voltages, a low pass filter 105 for reducing noise in the received focus error signal, a gain controller 106 for controlling the gain of the control system, a multiplier 107 for multiplying the received signal by a predetermined constant, a divider 108 for dividing the received signal by the sum signal, a phase compensating portion 109 for raising the phase margin of the control system, a focus search controller 110 for determining whether a focus controlling loop should be turned on, a switching portion 111 for switching the received signal, a driver 112 for converting the received voltage into a current, and a focus actuator 113 which is controlled by the received current.

In the first photodetecting portion 101, the four photodiodes are squarely arranged to determine whether the optical beam is accurately focused on a recording surface of a magnetooptical disk by an object lens. Four photodiodes A–D are used to improve the accuracy of the focus control. The more photodiodes used, the more accurate the control becomes, but the greater the cost.

In the second photodetecting portion 102, two photodiodes $\alpha$ and $\beta$ are arranged next to each other, and parallel to the tracks of the magnetooptical disk, to correctly control the track by determining whether the photodiodes move relative to the track desired by a track actuator. At least two photodiodes should be used. Unlike the first photodetecting portion 101, accuracy is not proportionally improved in relation to the increased cost of more photodiodes.

The photodiodes of the first and second photodetecting portions 101 and 102 convert the detected optical signals into current signals proportional to the magnitudes of the optical signal, and output the same.

The current-to-voltage converter portion 103 receives the output currents of the first and second photodetecting portions 101 and 102 and converts the same into voltage signals.

In the operator 104, the voltages output from the current-to-voltage converters 103A–D are divided into two symmetrical parts and a focus error signal generated by a subtraction of the two signals is output. Namely, the operator 104 generates a first operating signal in which the output voltages of the current-to-voltage converters 103A and 103B corresponding to the photodiodes A and B are added among the voltage signals corresponding to the optical signal detected in the photodiodes, and a second operating signal in which the output voltages of the current-to-voltage converters 103C and 103D corresponding to the two photodiodes C and D located symmetrically to the photodiodes A and B are added. Then, the operator 104 generates a focus error signal by subtracting the second operating signal from the first operating signal. Also, the operator 104 generates a third operating signal by adding the output voltages of the current-to-voltage converters 103E and 103F corresponding to the photodiodes α and β in the second photodetecting portion 102. Then, the operating portion 104 generates a sum signal by adding the first, second, and third operating signals.

At least two photodiodes which detect the optical signals of the magnetooptical disk generate the currents corresponding to the quantity of the detected light. The current signals become the focus error signal when there is a difference in voltages of the two signals, and this difference indicates the degree of focus departure after being converted into a voltage signal.

The low pass filter 105 reduces high frequency noise from the input focus error signal, and outputs a filtered error signal.

The gain controller 106 receives the filtered error signal, controls the gain thereof to be appropriate for the servo controlling device, and outputs the same. In other words, the gain controller 106 controls the gain of the servo to be within a stable range.

The multiplier 107 receives the gain-controlled focus error signal, multiplies the same by a predetermined constant, and outputs a multiplied signal.

The divider 108 divides the multiplied focus error signal by the sum signal. Here, the current signals corresponding to the quantity of the light detected by the photodiodes are converted into voltage signals, added, and output from the operator 104 as the sum signal.

The phase compensating portion 109 receives the output of the divider 108 and performs phase compensation to obtain a frequency range which has stable characteristics in the focus actuator 113 of a pickup device.

A focus search controller 110 receives the output of the phase compensating portion 109 and determines at which point in time the focus controlling loop should be turned on.

The above focus error signal is proportional to the degree of departure of the laser beam from the desired focus on the recording surface of the magnetooptical disk. The focus search controller 110 turns on the focus controlling loop to perform detailed control of the focus when the focus error signal is in the range of middle values after searching for minimum and maximum values of the focus error signal, moving the focus actuator 113 up and down. At this time, the range of middle values which turns on the focus control can vary according to the characteristics of the controlling device.

The focus search controller 110 turns on the focus controlling loop when the focus error signal is in a range of 50% of the difference between the minimum and maximum values, and turns off the focus controlling loop when the focus controlling loop exceeds 50%. In other words, the focus search controller 110 intercepts the transmission of the output of the phase compensating portion 109 to the driver 112 and moves the focus actuator 113 to be in the range of middle values, as discussed previously, using the search output of the focus search controller 110 when the output of the phase compensating portion 109 exceeds 50% of the difference between the minimum and maximum values.

The switching portion ill determines whether the output of the phase compensating portion 109 is output to the driver 112 or the search output of the focus search controller 110 is output to the driver 112 after determining whether the output signal of the phase compensating portion 109 is in the range of middle values in the focus search controller 110. In other words, the switching portion 111 outputs the output of the phase compensating portion 109 to the driver 112 and turns on the focus controlling loop when the focus error signal is in the range of middle values according to the determination of the focus search controller 110. However, if the focus error signal exceeds the range of middle values, the application of the output of the phase compensating portion 109 to the driver 112 is intercepted and the focus controlling loop is turned off so as to have the search output of the focus search controller 110 applied to the driver 112.

The focus controlling loop is turned on when the focus error signal is within the range of middle values by controlling the focus actuator 113 using the search output of the focus search controller 110 in a state in which the focus controlling loop is turned off.

The driver 112 receives the output of the switching portion 111 and outputs the voltage converted into a current to generate a torque required for driving the focus actuator 113. The focus actuator 113 receives the output of the driver 112 and sets the focus. By doing so, the present invention reduces the change in gain of the control system even when the amount of the light detected in the photodetecting portion changes.

If the amount of the light detected by the photodiode of the photodetecting portion increases, the focus error signal increases in proportion to the increase in the amount of light. Accordingly, the value of the focus error signal multiplied by a predetermined constant increases. The sum signal also increases, and the increase in the sum signal gets larger than that of the focus error signal. When the constant value of the multiplier 107 is set to make an increased factor of the focus error signal multiplied by the constant which is a numerator of a dividing process in the divider 108 similar to that of the sum signal which is a denominator, the change of gain of the control system according to the change in the amount of light detected can be reduced when compared to a conventional controlling device.

If the amount of detected light is reduced, there is a reverse effect. Namely, since a decreased factor of the focus error signal multiplied by the constant which is a numerator of the dividing process becomes similar to that of the sum signal which is a denominator during the dividing process in the divider 108, the change of gain of the control system according to the change in the amount of the light detected can be reduced when compared to that of the conventional controlling device.

As mentioned above, the controlling device according to the present invention maintains a uniform gain regardless of the change in amount of light detected in the photodetecting portion.

Figure 2:
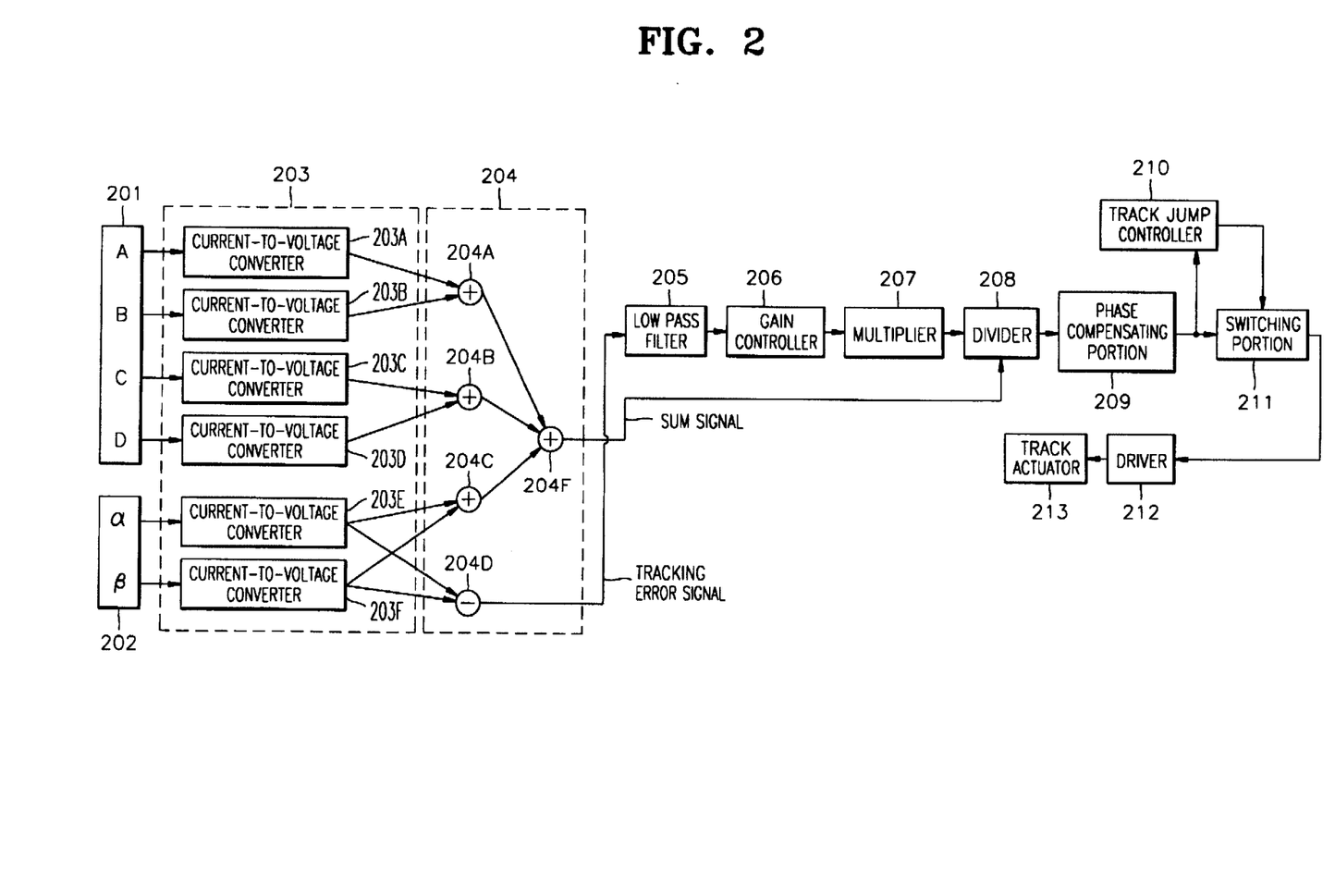
FIG. 2 is a block diagram illustrating a magnetooptical disk tracking servo which remains stable with changing quantities of detected light.

FIG. 2 is a block diagram which illustrates a magnetooptical disk tracking servo which remains stable with changing quantities of detected light. The tracking servo includes a first photodetecting portion 201 having at least two sets of photodiodes (A–D) for detecting an optical signal required for producing a sum signal and a tracking error signal, a second photodetecting portion 202 having at least two photodiodes ($\alpha$ and $\beta$) for detecting the optical signal required for producing the sum signal, a current-to-voltage converter portion 203 for converting the received currents into voltages, an operator 204 for calculating the tracking error signal and the sum signal using the currents converted into voltages, a low pass filter 205 for reducing noise in the received tracking error signal, a gain controller 206 for controlling the gain of the control system, a multiplier 207 for multiplying the received signal by a predetermined constant, a divider 208 for dividing the received signal by the sum signal, a phase compensating portion 209 for raising the phase margin of the control system, a track jump controller 210 for determining the track jump, a switching portion 211 for switching the received signal, a driver 212 for converting the received voltage into a current, and a track actuator 213 which is controlled by the received current.

In the first photodetecting portion 201, the four photodiodes A–D are squarely arranged to determine whether the optical beam is accurately focused on a recording-surface of the magnetooptical disk by an object lens. In this case, four photodiodes are used to improve the accuracy of the focus control.

In the second photodetecting portion 202, two photodiodes $\alpha$ and $\beta$ are arranged next to each other, and perpendicular to the tracks of the magnetooptical disk, to determine if the photodiodes move to the desired track by the track actuator. Here, at least two photodiodes should be used. In this case, accuracy does not proportionally improve in relation to the increased cost of additional photodiodes, unlike the case of the first photodetecting portion 201 for confirming the focus.

The photodiodes of the first and second photodetecting portions 201 and 202 convert the detected optical signal into current signals proportional to the magnitude of the optical signal.

The current-to-voltage converting portion 203 receives the output currents of the first and second photodetecting portions 201 and 202 and converts the same into voltage signals.

In the operator 204, the voltages output from the current-to-voltage converters 203A–D are divided into two symmetrical parts. Namely, the operator 204 generates a first operating signal in which the output voltages of the current-to-voltage converters 203A and 203B corresponding to the photodiodes A and B are added among the voltage signals corresponding to the optical signals detected in the photodiodes, and a second operating signal in which the output voltages of the current-to-voltage converters 203C and 203D corresponding to of the two photodiodes C and D symmetrically located to the photodiodes A and B are added.

The operator 204 generates a third operating signal by adding the output voltages of the current-to-voltage converters 203E and 203F corresponding to the photodiodes $\alpha$ and $\beta$ of the second photodetecting portion 202 and the tracking error signal by subtracting these two voltages. Then, the operator 204 generates a sum signal by adding the first, second, and third operating signals of the first and second photodetecting portions 201 and 202.

The tracking error signal in the present invention is the difference of the output voltages of the current-to-voltage converters 203E and 203F corresponding to photodiodes $\alpha$ and $\beta$ which determine the degree of departure of the photodiodes receiving the reflected light from the track of the magnetooptical disk.

The low pass filter 205 reduces high frequency noise in the tracking error signal and outputs a filtered tracking error signal.

The gain controller 206 receives the filtered tracking error signal, controls the gain thereof to be appropriate for the servo controlling device, and outputs the same. In other words, the gain controller 206 controls the gain of the controlling device to be within a stable operating range of the control system.

The multiplier 207 receives the gain-controlled tracking error signal, multiplies the same by a predetermined constant, and outputs a multiplied signal.

The divider 208 divides the multiplied tracking error signal by the sum signal.

The phase compensating portion 209 receives the output of the divider 208 and performs phase compensation to secure a frequency range which has stable characteristics in the track actuator 213 of the pickup device.

A track jump controller 210 makes the driving body of the second photodetecting portion 202 jump a track to detect optical signals of a desired track a using control signal input by the user. The track jump controller 210 also moves the driving body of the second photodetecting portion 202 sequentially from the inner circumference of the disk to the outer circumference thereof. The track jump controller 210 determines whether a current track will be repeatedly reproduced and generates a track jump drive voltage corresponding thereto. When the driving body jumps a track, the switching portion 211 prevents the output of the phase compensating portion 209 from being output to the driver 212, and instead supplies a track jump driving voltage to the driver 212.

The switching portion 211 selects one of the output of the phase compensating portion 209 and the track jump controller 210 output using a jump control signal which is input to the track jump controller 210 from an external source. Therefore, the switching portion 211 applies the output signal of the phase compensating portion 209 to the driver 212 when the track jump control signal by the outer user is not received. The switching portion 211 applies the output signal of the track jump controller 210 to the driver 212 when a track jump is determined by the track jump controller 210.

The driver 212 outputs a voltage converted into a current of the switched output signal to generate the torque required to drive the track actuator 213.

The track actuator 213 controls the photodetecting portion to reduce the magnitude of the track error signal by the controlled current signal and moves the photodetecting portion accurately over the track of the magnetooptical disk.

The present invention reduces the change of gain of the control system even though the amount of light detected in the photodetecting portion changes. If the amount of light detected in the photodiodes of the photodetecting portion increases, the tracking error signal increases proportionally to the increase in the amount of light detected. Accordingly, the value of the tracking error signal multiplied by a predetermined constant increases. The sum signal also increases, but greater than the tracking error signal. When the amplification factor of the constant value of the multiplier 207 is set to make the increased factor of the tracking error signal multiplied by the constant which is a numerator value of a dividing process in the divider 208 similar to that of the sum signal which is a denominator, the change of gain of the control system according to the change in the amount of light detected can be reduced when compared with the conventional controlling method.

If the amount of detected light is reduced, the reverse will occur. In other words, since the decreased factor of the tracking error signal multiplied by the constant which is a numerator value of the dividing process becomes similar to that of the sum signal which is a denominator during the dividing process in the divider 208, the change of gain of the control system according to the change in the amount of light detected can be reduced when compared with the conventional controlling device.

As mentioned above, the control system according to the present invention can maintain uniform gain regardless of a change in the amount of light detected by the pickup portion.

Figure 3:
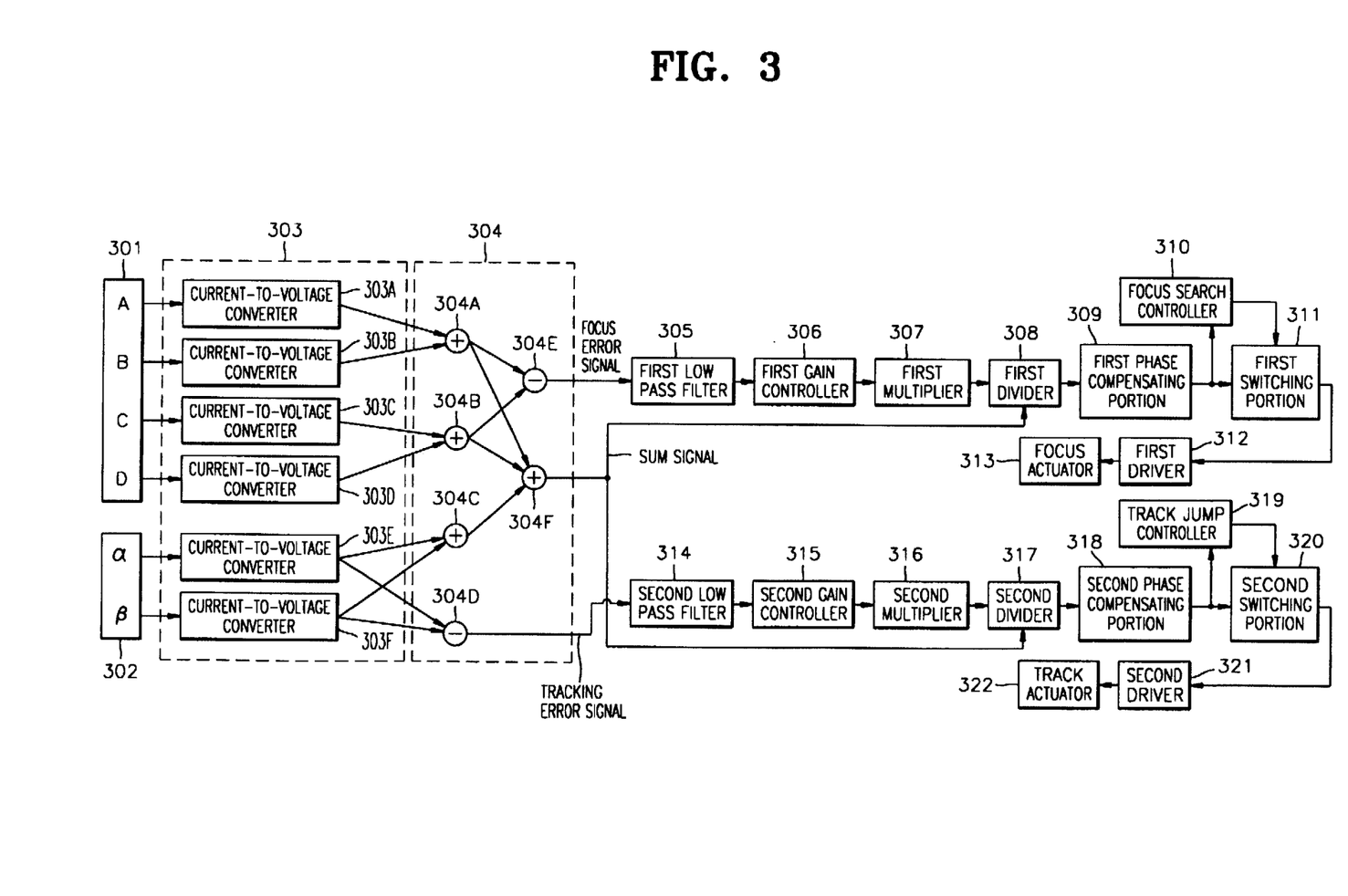
FIG. 3 is a block diagram illustrating a magnetooptical disk servo device which remains stable with changing quantities of detected light.

FIG. 3 is a block diagram which illustrates a magnetooptical disk servo which remains stable with changing quantities of detected light. The servo device includes a first photodetecting portion 301 having at least two sets of photodiodes (A–D) for detecting the optical signal required for producing a sum signal and a focus error signal, a second photodetecting portion 302 having at least two photodiodes (α and β) for detecting the optical signal required for producing the sum signal and a tracking error signal, a current-to-voltage converting portion 303 for converting the currents received from the photodetecting portions into voltages, and an operator 304 for generating the sum signal, the focus error signal and the tracking error signal using the total of the currents converted into voltages.

The servo device also includes a first low pass filter 305 for reducing noise in the focus error signal, a first gain controller 306 for controlling the gain of the control system, a first multiplier 307 for multiplying the received signal by a predetermined constant, a first divider 308 for dividing the received signal by the sum signal, a first phase compensating portion 309 for raising the phase margin of the control system, a focus search controller 310 for determining whether the focus controlling loop should be turned on, a first switching portion 311 for switching the received signal, a first driver 312 for converting the received voltage into a current, and a focus actuator 313 for performing control by the received current.

The servo device also includes a second low pass filter 314 for reducing noise in the tracking error signal, a second gain controller 315 for controlling the gain of the control system, a second multiplier 316 for multiplying the received signal by a predetermined constant, a second divider 317 for dividing the received signal by the sum signal, a second phase compensating portion 318 for raising the phase margin of the control system, a track jump controller 319 for determining whether or not a track jump is to be performed, a second switching portion 320 for switching the received signal, a second driver 321 for converting the received voltage to a current, and a track actuator 322 for performing the control according to the received current.

In the first photodetecting portion 301, the four photodiodes A–D are squarely arranged to determine whether the optical signal is accurately focused on the recording surface of the magnetooptical disk by the object lens. Four photodiodes are used to improve the accuracy of the focus control. The more photodiodes used, the greater the accuracy of the control, but the greater the cost.

In the second photodetecting portion 302, two photodiodes α and β are arranged next to each other, and perpendicular to tracks of the magnetooptical disk, to determine if the photodiodes move to desired tracks by the track actuator. At least two photodiodes should be used. In this case, accuracy is not remarkably improved in relation to the cost increase of additional photodiodes, unlike the case of the first photodetecting portion 301.

The photodiodes of the first and second photodetecting portions 301 and 302 convert the detected optical signals into current signals proportional to the magnitude of the optical signals, and output the same.

The current-to-voltage converter portion 303 receives the currents from the first and second photodetecting portions 301 and 302 and converts the same into voltage signals.

In the operator 304, the voltages received from the current-to-voltage converters 303A–D are symmetrically divided into two symmetrical parts which are subtracted to generate the focus error signal. Namely, the operator 304 generates a first operating signal in which the output voltages of the current-to-voltage converters 303A and 303B corresponding to the photodiodes A and B are added, and a second operating signal in which the output voltages of the current-to-voltage converters 303C and 303D corresponding to the two photodiodes C and D, symmetrically located to the photodiodes A and B, are added. Then, the operator 304 generates a focus error signal by subtracting the second operating signal from the first operating signal. Also, the operator 304 generates a third operating signal by adding the output voltages of the current-to-voltage converters 303E and 303F corresponding to the photodiodes α and β of the second photodetecting portion 302. Then, the operator 304 generates a sum signal by adding the first, second, and third operating signals.

At least two photodiodes which detect the optical signals of the magnetooptical disk generate the currents corresponding to the amount of detected light. The current signals become the focus error signal when there is a difference in voltages of the two signals, and this difference confirms the degree of departure from focus after being converted into a voltage signal.

The first low pass filter 305 reduces high frequency noise in the focus error signal.

The first gain controller 306 receives the filtered focus error signal, controls the gain thereof which is appropriate for the servo device, and outputs the same. In other words, the first gain controller 306 controls the gain of the controlling device to be within a stable range.

The first multiplier 307 receives the gain-controlled focus error signal, multiplies the same by a predetermined constant, and outputs a multiplied signal.

The first divider 308 divides the multiplied focus error signal by the sum signal. Here, the sum signal is the output signal of the operator 304 in which the current signals corresponding to the amount of light detected in the photodiodes are converted into the voltage signals and all the converted voltage signals are added.

The first phase compensating portion 309 receives the output of the first divider 308 and performs phase compensation to secure a frequency range which has stable characteristics in the focus actuator 313 of the pickup device.

The focus search controller 310 determines at which point in time the focus controlling loop should be turned on.

The above focus error signal is proportional to the degree of departure of the laser beam from the desired focus on the recording surface of the magnetooptical disk. The focus search controller 310 turns on the focus controlling loop to perform detailed control of the focus when the focus error signal is in the range of middle values after searching for minimum and maximum values of the focus error signal, moving the focus actuator 313 up and down. At this time, the range of the middle values which turns on the focus control can vary according to the characteristics of the controlling device.

The focus search controller 310 turns on the focus controlling loop when the focus controlling error signal is in a range of 50% of the difference between the minimum and maximum values, and turns off the focus controlling loop when the focus error signal exceeds 50%. In other words, the focus search controller 310 intercepts the transmission of the output of the phase compensating portion 309 to the first driver 312 and moves the focus actuator 313 to be in the range of middle values, as discussed previously, using the search output of the focus search controller 310 when the output of the phase compensating portion 309 exceeds 50% of the difference between the minimum and maximum values.

The first switching portion 311 determines whether the output of the phase compensating portion 309 is output to the first driver 312 or the search output of the focus search controller 310 is output to the first driver 312 after determining whether the output signal of the phase compensating portion 309 is in the range of middle values in the focus search controller 310. In other words, the first switching portion 311 outputs the output of the first phase compensating portion 309 to the first driver 312 and turns on the focus controlling loop when the focus error signal is in the range of middle values according to the determination of the focus search controller 310. However, if the focus error signal exceeds the range of middle values, the application of the first phase compensating portion 309 to the first driver 312 is intercepted and the focus controlling loop is turned off so as to have the search output of the focus search controller 310 applied to the first driver 312.

The focus controlling loop is turned on when the focus error signal is within the range of middle values by controlling the focus actuator 313 using the search output of the focus search controller 310 in a state in which the focus controlling loop is turned off.

The first driver 312 receives the output of the first switching portion 311 and outputs the voltage converted into a current to generate a torque required for driving the focus actuator 313. The focus actuator 313 receives the output of the first driver 312 and sets the focus. By doing so, the present invention reduces the change in gain of the control system even when the amount of light detected in the photodetecting portion changes.

If the amount of light detected by the photodiode of the photodetecting portion increases, the focus error signal increases in proportion to the increase in the amount of light detected. Accordingly, the value of the focus error signal multiplied by the predetermined constant increases. The sum signal also increases and the increase in the sum signal gets larger than that of the focus error signal. When the constant value of the first multiplier 307 is set to make an increased factor of the focus error signal multiplied by the constant which is a numerator of a dividing process in the first divider 308 similar to that of the sum signal which is a denominator, the change of gain of the control system according to the change in the amount of light detected can be reduced when compared to a conventional controlling device.

If the amount of detected light is reduced, there is an opposite effect. Namely, since a decreased factor of the focus error signal multiplied by the constant which is a numerator of the dividing process becomes similar to that of the sum signal which is the denominator during the dividing process in the first divider 308, the change in gain of the control system according to the change in the amount of light detected can be reduced when compared to that of the conventional controlling device.

The second low pass filter 314 reduces high frequency noise in the tracking error signal and outputs a filtered tracking error signal.

The second gain controller 315 receives the filtered tracking error signal, controls the gain thereof to be appropriate for the servo controlling device and outputs the same.

The second multiplier 316 multiplies the gain-controlled tracking error signal, multiplies the same by a predetermined constant, and outputs a multiplied signal.

The second divider 317 divides multiplied tracking error signal by the sum signal.

The second phase compensating portion 318 receives the output of the second divider 317 and performs phase compensation to secure a frequency range which has stable characteristics in the track actuator 322 of the pickup device.

The track jump controller 319 makes the driving body of the second photodetecting portion 302 jump a track to detect the optical signals of a desired track by a control signal input by the user, then jumps from an inner track to an outer track of the disk, or selects whether or not the present track is repeatedly reproduced, and generates the track jump driving voltage corresponding thereto.

When the driving body moves to another track, the second switching portion 320 prevents the output of the second phase compensating portion 318 from being output to the second driver 321, and supplies a track jump driving voltage to the second driver 321.

Namely, the second switching portion 320 applies the output signal of the second phase compensating portion 318 to the second driver 321 when the track jump controlling signal is not input by the user. The second switching portion 320 applies the output signal of the track jump controller 319 to the second driver 321 when a track jump is performed by the track jump controller 319.

The second driver 321 outputs a voltage converted to a current of the switched output signal to the track actuator 322 to generate the torque required for driving the track actuator 322.

The track actuator 322 controls the photodetecting portion to reduce the magnitude of the track error signal by the controlled current signal and moves the photodetecting portion accurately over the track of the magnetooptical disk.

The present invention reduces the change in gain of the control system even when the amount of light detected in the photodetecting portion changes. If the amount of light detected in the photodiodes of the photodetecting portion increases, the tracking error signal increases proportionally to the increase in the amount of light detected. The sum signal also increases, but greater than the tracking error signal. When the amplification factor of the constant value of the multiplier 316 is set to make the increased factor of the tracking error signal multiplied by the constant which is a numerator value of a dividing process in the second divider 317, similar to that of the sum signal which is a denominator, the change of gain of the control system according to the change in the amount of light detected can be reduced when compared with the conventional controlling method.

If the amount of detected light is reduced, the reverse occurs. In other words, since the decreased factor of the tracking error signal multiplied by the constant which is a numerator value of the dividing process becomes similar to that of the sum signal which is a denominator during the dividing process in the second divider 317, the change of gain of the control system according to the change in the amount of light detected can be reduced when compared with the conventional controlling device.

As mentioned above, the control system according to the present invention can maintain uniform gain regardless of a change in the amount of light detected by the pickup device.

As described above, according to the present invention, it is possible to prevent the oscillation of the magnetooptical disk focus and tracking servo device and stabilize the control system by maintaining a uniform gain of the control system of the focus and tracking servo devices, even when the amount of light detected by the photodiodes of the photodetecting portion changes.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A magnetooptical disk focus servo device which remains stable when varying amounts of are light detected by a photodetecting portion including a plurality of photodiodes, and which performs a focus servo control using a focus error signal generated using an output of said photodetecting portion, the device comprising:

an operator for outputting a sum signal generated by adding signals corresponding to the amount of light detected in at least two photodiodes among said plurality of photodiodes of said photodetecting portion;

a divider for dividing said focus error signal by said sum signal; and a focus servo for controlling a focus actuator with the output of said divider, to thereby reduce a change in gain of the servo device, wherein said focus servo comprises:

a phase compensator for phase compensating the output of said divider in order to obtain a stable frequency range;

a focus search controller for receiving the output of said phase compensator, and for determining when a focus controlling loop should be turned on; and a switch for determining whether the output of said phase compensator or the output of said focus search controller is output to said focus actuator based on an output from the controller.

2. A focus servo device as claimed in claim 1, further comprising a gain controller for controlling the gain of said focus error signal before multiplying said focus error signal in said multiplier.

3. A magnetooptical disk tracking servo device which remains stable when varying amounts of are light detected by a photodetecting portion including a plurality of photodiodes, and which performs a tracking servo control using a tracking error signal generated using an output of said photodetecting portion, the device comprising:

an operator for outputting a sum signal generated by adding signals corresponding to the amount of light detected in at least two photodiodes among the plurality of photodiodes of said photodetecting portion;

a divider for dividing said tracking error signal by said sum signal; and a tracking servo for controlling a track actuator with the output of said divider, to thereby reduce a change in a gain of the servo device, wherein said tracking servo comprises:

a phase compensator for phase compensating the output of the divider in order to obtain a stable frequency range;

a track jump controller for causing a driving body of said photodetecting portion to jump a track or to repeat a current track based on an output from the phase compensator; and a switch for determining whether the output of said phase compensator or the output of said track jump controller is output to said track actuator based on an output from the controller.

4. A servo device as claimed in claim 3, further comprising a second gain controller for controlling the gain of said tracking error signal before multiplying said tracking error signal by said constant.

5. A magnetooptical disk tracking servo device which remains stable when varying amounts of are light detected by a photodetecting portion including a plurality of photodiodes, and which performs a servo control using a focus error signal and tracking error signal generated using an output of said photodetecting portion, the device comprising:

an operator for outputting a sum signal generated by adding signals corresponding to the amount of light detected in at least two photodiodes among said plurality of photodiodes of said photodetecting portion;

a first divider for dividing said focus error signal by said sum signal;

a second divider for dividing said tracking error signal by said sum signal;

a focus servo portion for controlling a focus actuator with the output of said first divider to thereby reduce a change in gain of the servo device; and a tracking servo portion for controlling a track actuator with the output of said second divider to thereby reduce a change in gain of the servo device, wherein said focus servo comprises:

a first phase compensator for phase compensating the output of said first divider in order to obtain a stable frequency range;

a focus search controller for receiving the output of said first phase compensator, and for determining when a focus controlling loop should be turned on; and a first switch for determining whether the output of said first phase compensator or the output of said focus search controller is output to said focus actuator based on an output from the focus search controller; and wherein said tracking servo comprises:

a second phase compensator for phase compensating the output of said second divider in order to obtain a stable frequency range;

a track jump controller for causing a driving body of said photodetecting portion to jump a track or to repeat a current track based on an output from the second phase compensator; and a second switch for determining whether the output of said second phase compensator or the output of said track jump controller is output to said track actuator based on an output from the track jump controller.

6. A tracking servo device as claimed in claim 5, further comprising a gain controller for controlling the gain of said tracking error signal before multiplying said tracking error signal in said multiplier.

7. A servo device as claimed in claim 5, further comprising a first gain controller for controlling the gain of said focus error signal before multiplying said focus error signal by said constant.

8. A focus servo control method for a magnetooptical disk focus servo device which remains stable when varying amounts of are light detected by a photodetecting portion including a plurality of photodiodes, said method uses a focus error signal generated using an output of said photodetecting portion and comprises the steps of:

outputting a sum signal generated by adding signals corresponding to the amount of light detected in at least two photodiodes among said plurality of photodiodes of said photodetecting portion;

dividing said focus error signal by said sum signal; and     controlling a focus actuator with the result of the dividing step, to thereby reduce a change in gain of the servo device,     wherein said step of controlling said focus actuator comprises the steps of:

phase compensating the result of the dividing step in order to obtain a stable frequency range;

determining, based on the result of said phase compensating step, when a focus controlling loop should be turned on; and         outputting one of the result of the phase compensating step and said focus controlling loop to said focus actuator based on an output from the determining step.

9. A servo device as claimed in claim 8, further comprising the step of controlling the gain of said focus error signal before multiplying said focus error signal by said constant.

10. A tracking servo control method for a magnetooptical disk focus servo device which remains stable when varying amounts of are light detected by a photodetecting portion including a plurality of photodiodes, said method uses a tracking error signal generated using an output of said photodetecting portion and comprises the steps of:

outputting a sum signal generated by adding signals corresponding to the amount of light detected in at least two photodetecting portion;

dividing said tracking error signal by said sum signal; and     controlling a track actuator with the result of the dividing step, to thereby reduce a change in a gain of the servo device,     wherein said step of controlling said track actuator comprises the steps of:

phase compensating the result of the dividing step in order to obtain a stable frequency range; causing a driving body of said photodetecting portion to jump a track or to repeat a current track based on an output from the phase compensating step; and         outputting one of the results of said phase compensating step and said causing step to said track actuator based on the result of said causing step.

11. A servo device as claimed in claim 10, further comprising the step of controlling the gain of said tracking error signal before multiplying said tracking error signal by said constant.

12. A focus tracking servo control method for a magnetooptical disk focus and tracking servo device which remains stable when varying amounts of are light detected by a photodetecting portion including a plurality of photodiodes, said method uses a focus error signal and a tracking error signal generated using outputs of said photodetecting portion and comprises the steps of:

outputting a sum signal generated by adding signals corresponding to the amount of light detected in at least two photodiodes among said plurality of photodiodes of said photodetecting portion;

first dividing said focus error signal by said sum signal;

second dividing said tracking error signal by said sum signal;

controlling a focus actuator with the result of the first dividing step to thereby reduce a change in gain of the servo device; and     controlling a track actuator with the result of the second dividing step to thereby reduce a change in gain of the servo device,     wherein the step of controlling said focus actuator comprises the steps of:

first phase compensating the result of the first dividing step in order to obtain a stable frequency range;

determining when a focus controlling loop should be turned on based on the result of said first phase compensating step; and         outputting one of the results of the first phase compensating step and said focus controlling loop to said focus actuator based on the result of said determining step; and     wherein the step of controlling said track actuator comprises the steps of:

second phase compensating the result of the second dividing step in order to obtain a stable frequency range; causing a driving body of said photodetecting portion to jump a track or to repeat a current track based on the result of said second phase compensating step; and         outputting one of the results of said second phase compensating step and said causing step to said track actuator based on the result of said causing step.

13. A focus servo control method as claimed in claim 12, further comprising the step of controlling the gain of said focus error signal before multiplying said focus error signal in said multiplier.

14. A tracking servo method as claimed in claim 12, further comprising the step of controlling the gain of said tracking error signal before multiplying said tracking error signal in said multiplier.

* * * * *